March 21, 1933. J. A. YUNKER 1,902,746
PROCESS FOR THE PRODUCTION OF CARBON BLACK
Filed July 8, 1930
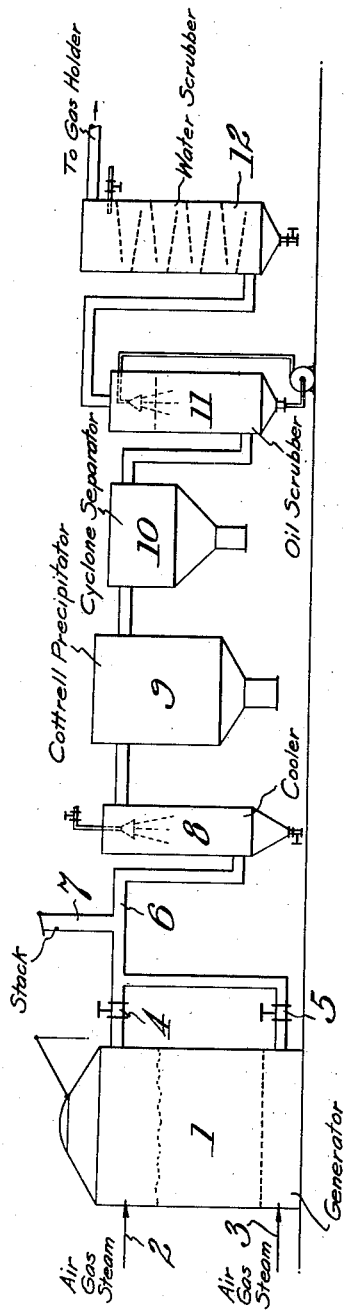

Patented Mar. 21, 1933

1,902,746

UNITED STATES PATENT OFFICE

JAMES A. YUNKER, OF LOUISVILLE, KENTUCKY, ASSIGNOR TO NATURAL GAS HYDROGEN CORPORATION, OF NEW YORK, N. Y., A CORPORATION OF DELAWARE

PROCESS FOR THE PRODUCTION OF CARBON BLACK

Application filed July 8, 1930. Serial No. 466,558.

An object of the present invention is to provide an improved process for the production of carbon black suitable for use in printing inks, rubber manufacture, etc.

Carbon black commonly is produced by controlled combustion of natural gas, in such a way that the carbon black is deposited in the form of a soot. The yield of carbon black by this process varies but 1 to 2 pounds of carbon black per 1000 cubic feet of gas consumed may be said to represent the average yield. The carbon black is the only useful product of this process.

It is obvious that if the methane content of natural gas could be decomposed completely into its elements, carbon and hydrogen, approximately thirty-two (32) pounds of carbon would be produced per 1000 cubic feet of methane decomposed and at the same time there would be obtained about 2000 cubic feet of hydrogen which would have a value in many commercial applications. For many years attempts have been made to produce carbon black by a thermal decomposition method and several of such methods have been developed which are more or less commercially successful.

I have found that by a method which heretofore has not been used for the production of carbon black, I can produce a commercial carbon black in yields heretofore unsurpassed, while at the same time producing a gas of predetermined hydrogen content up to almost pure hydrogen. In addition my process permits the making of a variety of grades of carbon black. Due to the extreme flexibility of the process with the resultant variations in the quantity and quality of the carbon black and of the heat value and chemical composition of the gases produced, it is of especial value not only in the carbon black business but also in the production of industrial hydrogen and as an adjunct to the gas utility business.

The economic value of the invention is further enhanced by reason of the low cost of operating the process from the standpoint of apparatus, labor costs and raw materials, and further by the fact that the hydrocarbons are used solely to produce useful products no part of them being used for heating.

My process comprise contacting natural gas hydrocarbons including for instance methane, ethane, propane, butane, and pentane, or gas mixtures containing the same such as petroleum refinery gases, but preferably natural gas of high methane content, with incandescent coke, removing the resulting gases and carbon dust from the contacting zone and separating and recovering carbon black from the gases.

The accompanying drawing is a diagrammatic illustration of one form of apparatus suitable for carrying out a specific procedure in accordance with the invention.

Referring to the drawing, 1 represents a standard water gas generator provided with inlets 2 and 3 for the introduction of gas, steam and air into the generator, above and below the fuel bed and outlets 4 and 5 for the removal of gaseous products carrying carbon black in suspension for the generator above and below the fuel bed. For simplicity, the actual construction of the apparatus, which is well known, and the piping and valves for the introduction of air, gas and steam, and the withdrawal of gaseous products which readily can be provided, are not illustrated. Pipes 4 and 5 deliver into a common conduit 6 through which the gases may flow to the stack 7 or to the carbon black recovery and gas purifying and storage apparatus 8, 9, 10, 11 and 12. It will be understood that the invention is not limited to the use of a conventional water gas generator, but may employ an especially designed apparatus in which a fuel bed of coke of the desired size can be established and maintained and provided with means for the introduction and withdrawal of gases. It is further to be understood that the invention is not limited to any particular method of or apparatus for the treatment of the gases leaving the generator for the recovery of carbon black, the apparatus illustrated and described herein being merely one form of apparatus suitable for carrying out the process of the invention.

The conduit 6 delivers into a cooler 8 (which might be replaced by heat exchanging apparatus) in which the gases are cooled to a temperature suitable for the subsequent treatment, say to about 400° F. The gases then pass, for example, through the electrostatic precipitator 9 or other suitable flocculating device, and the cyclone collector 10, both of conventional design, then through the oil scrubber 11 and the water scrubber 12 to storage or utilization.

A typical procedure in carrying out the process in the apparatus illustrated is as follows: A fuel bed of coke is built up in the generator 1 and brought to a temperature sufficient to crack the hydrocarbons being processed, i. e., a temperature in the case of methane, say between about 1200° C. and 1400° C. or higher, by blasting with air, the blast gases passing to waste through the stack 7. These gases might be used for heating purposes or otherwise without departing from my invention which is not concerned with the disposition of the blast gases. The generator is then purged of air by a short blasting with steam, the resulting gases being vented or otherwise disposed of, and then the gas containing hydrocarbons, for instance natural gas, is passed through the fuel bed, the resulting gases being passed through the treating units 8, 9, 10, 11 and 12 in series. When the fuel bed has cooled down to say about 1200° C., the cycle is repeated with suitable variations in order to maintain the fuel bed in the optimum condition.

The qualities by which carbon black is valued are in the main fineness of the carbon particles, color, tinctorial value, its favorable effect on the physical properties of rubber compositions or other plastics, freedom from tarry and oily matters, etc., and obviously the yield of a carbon black is an important consideration.

I have found it to be possible by my invention to vary not only the amount of carbon black produced per unit of gas treated, but within wide limits, to vary the quality of the carbon black made. In addition I can produce carbon blacks having new combinations of properties which make them especially desirable for particular purposes.

In my process some of the factors which have been found to be important and by the variation of which I attain the above described results are depth of the fuel bed used, the temperature of the fuel bed at the time the hydrocarbon gases are admitted to the generator, the character and size of the coke used in the fuel bed, the rate at which the hydrocarbon gases are passed through the fuel bed, that is, the space velocity of the reaction, the temperature at which the carbon black is collected and the method of collection, the presence of inert gases in the hydrocarbon gases treated, etc.

For example, using a generator nine feet in diameter (seven feet inside diameter) and a train of collecting apparatus as described above, with a fuel bed which was carried between eight to ten feet in depth, with blocky metallurgical coke sized four to six inches, and with a cycle of three and one-half minutes' blasting with air, one-half minute purging with steam, and ten minutes' running with a 1130 B. t. u. natural gas at a rate of 400 cubic feet per minute, approximately seven pounds of salable carbon black per one thousand cubic feet of natural gas treated were recovered directly.

The carbon black had the following characteristics:

When mixed into the following rubber compound

*Formula*

| | |
|---|---|
| Smoked sheets | 930 |
| Black | 350 |
| Zinc oxide | 30 |
| Sulphur | 50 |
| D. P. G. | 7½ |
| | 1367½ | and vulcanized in a platen press between steel plates at steam pressure corresponding to 274° F. for thirty minutes, the samples being then quenched in cold water for twenty minutes and rested for eighteen hours, test pieces being then cut and tested according to the 1930 specification of the Physical Testing Committee of the American Chemical Society, gave the following physical properties when broken at approximately 80° F.:

Modulus of elasticity at 300% elongation, 225 pounds per square inch.

Modulus at 700% elongation, 3100 pounds per square inch.

Tensile strength at rupture 4300 pounds per square inch.

Elongation at rupture 800%.

In addition to the carbon black recovered, approximately 2200 cubic feet, per 1000 cubic feet of natural gas processed, of gas containing 93% of hydrogen, 3% methane, 2.0% carbon oxides, .5% illuminants and 1.5% nitrogen was produced.

In the above cycle both the blast and purge gases were wasted through the stack. If these gases had been passed through carbon recovering apparatus, the yield of carbon black would have been increased.

By using the above procedure except that the cycle was modified to three minutes air blast, one-half minute steam purge, and eight minutes gas run at a rate of 1000 cubic feet of gas per minute, approximately eight pounds of carbon black per thousand cubic feet of gas treated was recovered. This carbon black had the following properties:

When mixed into the following rubber compound

Formula

| | |
|---|---|
| Smoked sheets | 930 |
| Black | 350 |
| Zinc oxide | 30 |
| Sulphur | 50 |
| D. P. G. | 7½ |
| | 1367½ | and vulcanized in a platen press between steel plates at steam pressure corresponding to 274° F. for thirty minutes, the samples being then quenched in cold water for twenty minutes and rested for eighteen hours, test pieces then being cut and tested according to the 1930 specification of the Physical Testing Committee of the American Chemical Society gave the following physical properties when broken at approximately 80° F.:

Modulus of elasticity at 300% elongation, 250 pounds per square inch.

Modulus at 700% elongation, 3400 pounds per square inch.

Tensile strength at rupture, 4600 pounds per square inch.

Elongation at rupture 790%.

In addition to the above mentioned physical properties when vulcanized in the above mentioned rubber compound, the carbon black showed an unusual facility of admixture with the rubber on the mixing rolls; for example, in the above compound the time of mixing was three minutes. In the same compound, when in place of the carbon black of my invention there was substituted standard impingement carbon black, such for instance that known as Micronex, the time of mixing was seven minutes.

It is evident from the above description that the carbon black of my invention exhibits new properties in rubber compounding. Together with greater ease of admixture, it combines improved flexibility (as shown by the values for modulus of elasticity) and also exceedingly high tensile strength at rupture.

In this case there was recovered in addition to the carbon black approximately 1750 cubic feet of gas containing 16% methane, 80% hydrogen, 2% carbon oxides, .5% illuminants and 1.5% nitrogen.

The gas from the first of the two specific procedures described immediately above, containing as it does 93% of hydrogen, needs very little further processing to purify it sufficiently for use in chemical processes.

The gas of the last of the two described procedures has a heat value of approximately 440 B. t. u. per cubic foot and is well suited for blending with other gases for utility use. This gas can also be passed through the fuel bed in the generator and converted into almost a pure hydrogen gas.

In the procedures described above certain requirements of the operations which have a real bearing on the success attained have not been mentioned. For instance, in running air or gas through the generator, the direction of flow is reversed or the individual runs may be split to keep the temperature of the fuel bed uniform throughout its depth. This also helps to keep the fuel bed from becoming clogged or caked with deposited carbon which would interfere with the process.

The principal purpose of the short steam purge is to drive out any air remaining at top or bottom of the generator, since the natural gas or its decomposition gases might bring about an explosion if introduced into this residual air in the presence of the incandescent coke. The purge is also used to help condition the fuel bed as set out in the preceding paragraph.

I have also found it useful to periodically substitute a steam run of varying length for the gas run. In the resultant water gas reaction the oxygen of the steam apparently unites with some of the loose carbon previously deposited and removes it. The yield of carbon black is increased and the pressure drop through the fuel bed is decreased by the action of the steam run.

For instance, in the cycles described in detail above, a steam run of two minutes up and two minutes down every fifth cycle has been found to give good results.

By still otherwise varying the factors previously set out as affecting the quantity and quality of the carbon yield, I have been able to produce a variety of types of carbon black some of which do not now have counterparts in the trade.

I claim:

1. Process for the production of carbon black which comprises blasting an ignited bed of coke with an oxygen-containing gas to a temperature of at least about 1200° C., purging the coke bed with steam, passing a hydrocarbon gas through the bed of coke and separating and recovering carbon black from the resulting gases, and continuously repeating the series of operations while varying the time of treatment and direction and rate of flow of the oxygen-containing gas, the steam and the hydrocarbon to maintain the coke bed in operative condition.

2. In the production of carbon black by continuously repeating the cycle of operations, comprising blasting an ignited bed of coke with an oxygen-containing gas, purging the bed of coke with steam, passing a hydrocarbon gas through the bed of coke and collecting carbon black from the resulting gases, the step which consists in occasionally substituting steam for hydrocarbon gas in the cycle to condition the coke bed.

3. Process of making carbon black which comprises blasting a bed of ignited coke with air, purging the coke bed with steam, passing natural gas through the bed of coke and continuously repeating this series of steps, collecting carbon black from the gases produced by the passage of natural gas through the coke bed, and occasionally substituting steam for natural gas in the cycle.

4. Process of making carbon black which comprises establishing an ignited bed of metallurgical coke of substantially uniform size, and maintaining said bed of coke by periodically supplying fresh coke thereto and removing ash therefrom, continuously repeating the cycle of operations, consisting of blasting the coke with air, purging the blasted coke with steam, and passing natural gas through the purged coke, varying the period, rate and direction of movement of the air, steam and natural gas through the coke bed to maintain it at a fairly uniform temperature, and periodically substituting steam for natural gas in the cycle of operations.

In testimony whereof, I affix my signature.

JAMES A. YUNKER.